Jan. 10, 1967 B. TOPAS ETAL 3,297,921

CONTROLLED RECTIFIER HAVING SHUNTED EMITTER FORMED BY A NICKEL LAYER UNDERNEATH AN ALUMINUM LAYER

Filed April 15, 1965

INVENTORS
BENJAMIN TOPAS
HAROLD WEINSTEIN
BY
OSTROLENK, FABER, GERB & SOFFEN
ATTORNEYS

United States Patent Office 3,297,921

Patented Jan. 10, 1967

3,297,921

CONTROLLED RECTIFIER HAVING SHUNTED EMITTER FORMED BY A NICKEL LAYER UNDERNEATH AN ALUMINUM LAYER

Benjamin Topas, Santa Monica, and Harold Weinstein, Van Nuys, Calif., assignors to International Rectifier Corporation, El Segundo, Calif., a corporation of California Filed Apr. 15, 1965, Ser. No. 448,398
3 Claims. (Cl. 317—234)

This invention relates to controlled rectifiers, and more specifically relates to a novel shunted emitter construction for a controlled rectifier wherein a thin nickel layer is interposed between an aluminum emitter shunt and the surface of the wafer.

In order to improve the *dv/dt* of a controlled rectifier, it is possible to place an aluminum shunting strip over the gate cathode junction. This permits the main power circuit of the wafer to become conductive over its full area more quickly, rather than having it initially conductive immediately adjacent the area of the gate electrode with this localized conduction thereafter spreading out from this localized region.

We have found that when an aluminum strip is used in this manner, it causes a P-type re-growth region on the N-type cathode surface material, thus forming a rectifier barrier which affects the operation of the device and increases the forward voltage drop of the device.

The principle of the present invention is to provide a novel structure and method which retains an aluminum shunting strip for the gate cathode junction, but interposes a thin nickel barrier between the shunting strip and the wafer surface. This thin nickel barrier has been found to prevent the formation of a P-type re-growth region in the N-type material of the wafer, whle permitting the formation of a suitable ohmic contact region on the P-type region of the wafer surface. Thus, the invention prevents the formation of an additional rectifier barrier, thereby eliminating this cause of increased forward voltage drop in the main power circuit of the device.

Accordingly, a primary object of this invention is to improve the *dv/dt* of a controlled rectifier without increasing the forward voltage drop of the device.

Yet another object of this invention is to permit the use of an aluminum shunting strip over the gate cathode junction of a controlled rectifier without forming an additional rectifier barrier in the N-type region of the wafer surface.

Yet another object of this invention is to provide a molecularly thin nickel layer over the full wafer surface of a controlled rectifier and to deposit thereon an aluminum shunting strip which shunts the gate cathode junction.

These and other objects of this invention will become apparent from the following description when taken in connection with the drawings, in which.

Figure 1:
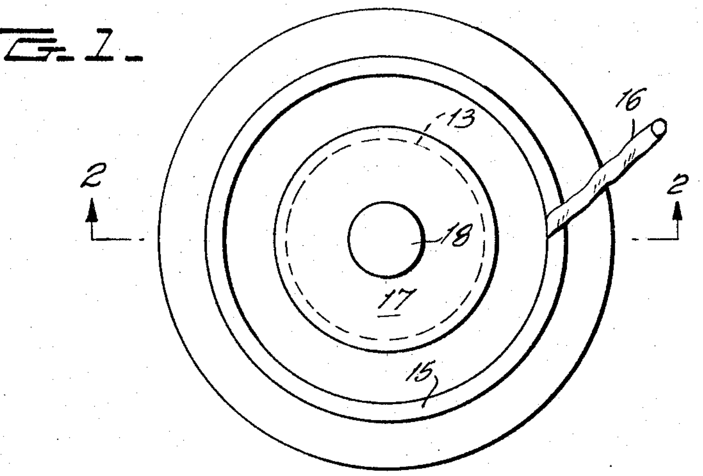
FIGURE 1 is a top view of a device using an aluminum strip for shunting the gate cathode junction.
Figure 2:
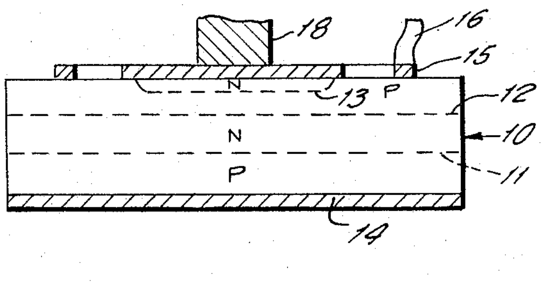
FIGURE 2 is a cross-sectional view of FIGURE 1 taken across the lines 2—2 in FIGURE 1.
Figure 3:
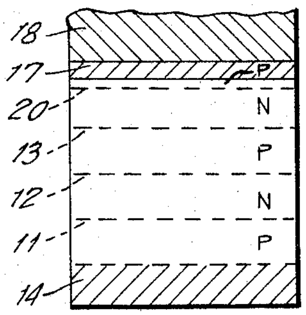
FIGURE 3 is an enlarged view of the upper N-type region of FIGURE 1, and illustrates the manner in which an additional rectifier barrier is formed in the N-type region which will decrease the forward voltage drop of the device.

Referring first to FIGURES 1, 2 and 3, we have illustrated therein a typical controlled rectifier arrangement which can be made in accordance with well-known techniques. Thus, the wafer 10 may be a single crystal semiconductor wafer of, for example, silicon which has therein three junctions 11, 12 and 13 between the four layers which are of the P-N-P-N conductivity types, respectively.

The bottom of the wafer is then provided with an anode electrode 14 which could, for example, be a molybdenum disk, while the upper surface has an electrode ring 15 which serves as the gate electrode and is connected to a gate lead 16.

A thin aluminum strip 17 is then alloyed to the upper surface of the wafer and extends across the planar edges of junction 13 so that a shunted emitter arrangement is formed in order to improve the *dv/dt* of the device.

The main cathode lead 18 is then connected to the aluminum region 17. Note that all dimensions have been greatly exaggerated in the drawings for purposes of clarity. In actuality, the alloyed strip 17 is an extremely thin strip of the order of ½ mil in thickness, and its lower surface defines an aluminum silicon alloy.

It has been found that when an aluminum emitter strip is used in this manner, a re-growth region will occur in the N-type region above junction 13, as best shown in FIGURE 3, wherein this re-growth region is of the P-type and defines a rectifying barrier 20. This rectifier barrier 20 will, of course, increase the forward voltage drop in the main power circuit of the device which is from anode 14 to cathode 17.

Figure 4:
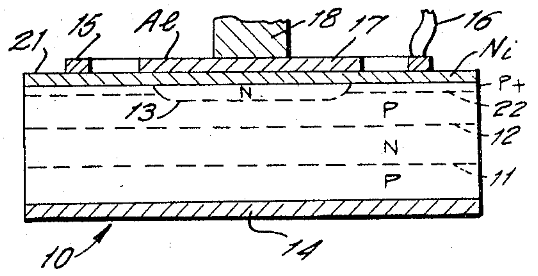
FIGURE 4 is a cross-sectional view similar to FIGURE 2 which illustrates the novel use of a nickel layer interposed between the wafer surface and the aluminum shunting strip.

The principle of the present invention is to place a thin nickel layer across the upper surface of the wafer prior to placing the aluminum shunting strip 17 on the surface. Thus, as shown in FIGURE 4 which is identical to FIGURES 1, 2 and 3 with the exception of a nickel layer 21 atop the surface of wafer 10, the aluminum layer 17 is placed immediately atop the nickel layer 21.

More particularly, and in accordance with the invention, after the formation of the junctions in wafer 10, nickel layer 21 which is as thin as possible is applied over the complete surface of the wafer. For example, nickel layer 21 could have a thickness of the order of 0.05 times $10^{-6}$ inches. This could be laid down over the wafer surface by plating or by evaporation techniques.

Thereafter, the nickel plating is sintered or alloyed at a temperature of the order of 790° C. for 1 hour to form a nickel silicon solution at the upper surface of the wafer. Note that at the same time, the molybdenum disk 14 can be secured to the bottom of the wafer. Thereafter, the aluminum sheet 17 is applied to the upper silicon nickel surface of the wafer, and is alloyed thereto as by heating the assemblage at 760° for 15 minutes.

It has been found that during this alloy operation, the nickel layer will prevent the formation of a P-type re-growth region in the N-type region above the junction 13, although it permits the formation of a suitable ohmic contact region above junction 12. Thus, a P+ region will be formed above the dotted line 22 in FIGURE 4. That is to say, the nickel will not prevent the diffusion of aluminum atoms into the P-type surface while it does prevent diffusion into the N-type layer. Note that the nickel layer need not extend over the P-type layer portion of the surface of wafer 10.

Thereafter, the complete device may be etched and operated upon in any other desired manner, and the electrode leads such as leads 16 and 18 may be applied thereto.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A controlled rectifier comprising a wafer of silicon having a first, second and third parallel spaced junctions therein; said third junction having the edges thereof terminating in a closed line on the upper surface of said wafer; the material above said third junction having N-type conductivity; the material surrounding and below said third junction having P-type conductivity; a nickel barrier layer extending over at least the surface of said wafer contained within said closed line and alloyed into said surface, an aluminum layer extending over the top of said nickel and extending across the edges of said third junction, and alloyed to said nickel-silicon alloy extending across said upper surface of said wafer.

2. The rectifier substantially as set forth in claim 1 wherein said nickel layer has a thickness of approximately $0.05 \times 10^{-6}$ inches to prevent the formation of a regrowth P-type region atop said N-type region above said third junction.

3. The rectifier substantially as set forth in claim 2 wherein said nickel barrier layer extends over the full upper surface of said wafer.

References Cited by the Examiner

UNITED STATES PATENTS

| | | | |
|---|---|---|---|
| 2,745,047 | 5/1956 | Lighty | 317—241 |
| 3,052,572 | 9/1962 | Hase | 117—200 |
| 3,116,443 | 12/1963 | Forester | 317—324 |
| 3,169,204 | 2/1965 | Gould | 29—155.5 |

JOHN W. HUCKERT, *Primary Examiner.*

M. EDLOW, *Assistant Examiner.*